United States Patent [19]

Watanabe et al.

[11] Patent Number: 4,951,627
[45] Date of Patent: Aug. 28, 1990

[54] ENGINE IDLING SPEED CONTROL SYSTEM FOR INTERNAL COMBUSTION ENGINE

[75] Inventors: Yoji Watanabe; Hiroyuki Ishibashi, both of Hiroshima, Japan

[73] Assignee: Mazda Motor Corp., Hiroshima, Japan

[21] Appl. No.: 408,245

[22] Filed: Sep. 18, 1989

[30] Foreign Application Priority Data

Sep. 16, 1988 [JP] Japan .................. 63-232988

[51] Int. Cl.⁵ .............................................. F02D 9/02
[52] U.S. Cl. .................................................. 123/339
[58] Field of Search ............... 123/339, 340, 341, 585, 123/587

[56] References Cited

U.S. PATENT DOCUMENTS

| | | | |
|---|---|---|---|
| 4,875,447 | 10/1989 | Kiuchi et al. | 123/339 |
| 4,877,003 | 10/1989 | Shimomura et al. | 123/339 |
| 4,879,983 | 11/1989 | Shimomura et al. | 123/339 |
| 4,883,034 | 11/1989 | Yashiki et al. | 123/339 |
| 4,884,540 | 12/1989 | Kishimoto et al. | 123/339 |
| 4,887,570 | 12/1989 | Meicher | 123/339 |

FOREIGN PATENT DOCUMENTS 60-19933 2/1985 Japan .

Primary Examiner—Raymond A. Nelli
Attorney, Agent, or Firm—Fleit, Jacobson, Cohn, Price, Holman & Stern

[57] ABSTRACT

In an engine idling speed control system for an internal combustion engine, by feedback controlling increasingly or decreasingly, the amount of intake air fed to the engine with a controlling value variable in accordance with a difference between an actual engine speed and a desired idling speed so as to control the engine to drop speed to the desired idling speed, decreasing variations of the controlling value are restricted to a limit value which is higher when the vehicle is running at a speed higher than a predetermined vehicle creeping speed than when at a running speed lower than the predetermined vehicle creeping speed.

11 Claims, 4 Drawing Sheets

ENGINE IDLING SPEED CONTROL SYSTEM FOR INTERNAL COMBUSTION ENGINE

FIELD OF THE INVENTION

The present invention relates to a control system for maintaining an engine idling speed of an internal combustion engine at a desired engine idling speed, and more particularly to an engine idling speed control system for an internal combustion engine with an automatic transmission equipped with a torque converter for maintaining the desired engine idling speed by controlling an intake air flow rate.

BACKGROUND OF THE INVENTION

In an electronic controlled engine idling speed control system of an internal combustion engine for an automotive vehicle which has become increasingly popular, an intake air control system is used together with an electronic controlled fuel injection system. This type of intake air control system has an intake air passage bypassing a throttle valve disposed in an intake manifold and an intake air control means, such as an electronic controlled throttle valve, provided in the bypass passage for controlling the amount of intake air flowing through the bypass passage when the throttle valve is in the idle position, or at the minimum throttle opening. The amount of intake air is feedback controlled in accordance with the difference between an actual engine speed detected by means of an RPM sensor, or a crank angle sensor, and a desired engine idling speed so as to operate the internal combustion engine at the desired engine idling speed.

To perform this feedback control, an engine control unit (ECU), which generally consists of a microprocessor, is used as an intake air feedback control means. The engine control unit feedback controls the intake air control means by the use of primary intake air flow controlling values previously provided in accordance with desired engine idling speeds. When the actual engine speed of rotation of the internal combustion engine thus controlled by the use of the primary intake air flow controlling value disagrees with the desired engine idling speed, the primary intake air flow controlling value is, either increasingly or decreasingly, correctively changed in accordance with the difference between the actual engine speed and the desired engine idling speed, and loadings on the internal combustion engine, so as to make the actual engine speed agree with the desired engine idling speed.

An eventual controlling value G for controlling the intake air control means, in which the difference in speed and loads on the internal combustion engine are taken into account, is expressed in the following general formula:

$$G = G_B + \Sigma G_L + G_{FB} \qquad (I)$$

wherein $G_B$ is the primary intake air controlling value,
$\Sigma G_L$ is the load correcting value depending on loadings on the internal combustion engine, and
$G_{FB}$ is the feedback correcting value in accordance with the difference between the actual engine speed and the desired engine idling speed.

The primary intake air controlling value $G_B$ generally depends upon the temperatures of cooling water based on the inherent primary value of the internal combustion engine running with no loading. The load-depending correcting value $\Sigma G_L$ is determined corresponding to the sum of values inherent in various kinds of loadings, such as an air conditioning system, a power steering system, a headlight system, etc. This load-depending correcting value serves to cause an uniform increase of intake air flow. The speed-depending feedback correcting value $G_{FB}$ is a value used in closed-loop control which is determined depending upon the difference between the actual engine speed and the desired engine idling speed and upon the change in engine operating conditions.

As apparent from the above general formula (I) from which is calculated a duty ratio of a control signal at which a solenoid means of the intake air control means should be operated, the eventual controlling value G is determined based mainly on a particular fixed value inherent in the internal combustion engine and the temperature of cooling water, which is a parameter representative of a state of the internal combustion engine, and subordinately on the load-depending correcting value $\Sigma G_L$ and the speed-depending feedback correcting value $G_{FB}$ depending upon the difference $\Delta N_E$ between the actual engine speed $N_E$ and the desired engine idling speed $N_{OID}$ which depends upon the temperature of cooling water.

Control of the amount of intake air by the use of the speed-depending feedback correcting value $G_{FB}$ is effected only in a feedback control range, hereinafter referred simply to as an F/B range, while the internal combustion engine idles. Judgement of the F/B range is made in accordance with the conditions of an idle switch (which is turned on when the throttle valve is in its idle position) and a primary engine speed $N_{OFB}$ (which is determined inherently in the characteristics of the internal combustion engine and somewhat higher than the desired engine idling speed $N_{OID}$). That is, the engine operating condition is judged to be in the F/B range when the condition that the idle switch is turned on and the actual engine speed $N_E$ drops down lower than the primary engine speed $N_{OFB}$ is satisfied.

In an application of the engine idling speed control system described above to an automotive vehicle equipped with an automatic transmission of the type having a torque converter (which is hereinafter referred to simply as an A/T vehicle), a problem of creeping is encountered. That is, if the throttle valve is completely closed, or in its idle position, by removing one's foot from an acceleration pedal when the brake is completely released, although the internal combustion engine is idling when the automatic transmission is shifted from a non-driving range, such as a park range (P) or a neutral range (N), into a driving range, such as a drive range (D), the A/T vehicle generally starts and creeps at a low speed of about 3 to 4 Km/h. As is apparent, in automatic transmissions of the type described above, the automatic transmission fluid-couples the output shaft of the internal combustion engine to the driven shaft of the torque converter in the driving range, such as the drive range (D), unlike in the non-driving range, such as the neutral range (N). Thus the engine output torque, depending upon the number of rotations of the idling engine, is transmitted to a drive line of the A/T vehicle, so that, on one hand, the A/T vehicle is driven or creeps and, on the other hand, this creeping of the A/T vehicle puts loads on the idling engine. As a result, the engine speed $N_E$ unavoidably becomes lower by a certain number of revolutions per second than an engine idling speed in the neutral range (N) or in the park range (P) when the automatic transmission shifts itself to the driving range from the non-driving range.

To prevent such a drop of engine speed, the amount of intake air is increasingly controlled depending on loadings on the internal combustion engine from the automatic transmission. For this control, a load-depending correcting value $G_L$ inherent in the automatic transmission itself is previously given so as to automatically increase the amount of intake air, thereby preventing a drop of engine speed. Such a feedforward control system is known from Japanese Unexamined Patent Publication No. 60-19,933 entitled "Method of Controlling Rotational Speed of Internal Combustion Engine", published Feb. 1, 1985.

Loadings on the internal combustion engine from the automatic transmission in the driving range, such as the drive range (D), are significantly different between when either a foot-brake or a hand-brake, or both, are applied to stop the A/T vehicle and when these brakes are released, thereby allowing the A/T vehicle to creep. That is, while the A/T vehicle is creeping, because the relative turbine and pump speeds of the torque converter drops, the torque converter encounters an increased frictional drag of a coupling fluid and the A/T vehicle produces a running inertia, resulting in an increase of stability in rotation of the internal combustion engine. Accordingly, loadings on the internal combustion engine from the automatic transmission are considerably lowered in creeping conditions relative to in braked conditions which the pump of the torque converter continues to rotate while the turbine of the torque converter is locked.

Reference should now made be to FIG. 1(A)-(C) to illustrate an example wherein the A/T vehicle, stationarily running at a certain speed V (in Km/h) with the internal combustion engine operating at a speed rotation of $N_E$ (in rpm) begins to decelerate at a time $t_1$. When the throttle valve is fully closed at the time $t_1$ to decelerate the automotive vehicle without application of brake force, the A/T vehicle gradually loses speed as the speed of the internal combustion engine drops. It is, however, to be noted that there is a slight time delay between the decrease of the vehicle speed and of the engine speed. At a time $t_2$, the internal combustion engine is slowed to the primary engine speed $N_{OFB}$ (which is determined to be approximately 600 rpm greater than the desired engine idling speed $N_{OID}$ in order to avoid down shooting), and feedback control is initiated to control the amount of intake air into the internal combustion engine so that the internal combustion engine drifts down to the desired engine idling speed $N_{OID}$.

At this time, however, because the actual engine speed $N_E$ is still greater than the engine idling speed $N_{OID}$ and the running speed V of the A/T vehicle is significantly greater than a speed at which the vehicle creeps due to inertial running, a loading on the internal combustion engine from the automatic transmission is quite considerably small. Accordingly, the load-depending correcting value $G_L$ depending upon the transmission loading is primarily small and, before the drifting of the engine speed $N_E$ down to the desired engine idling speed $N_{OID}$, the speed-depending feedback controlling value $G_{FB}$ in intake air F/B control is decreasingly changed to a limit value or guard value $G_{FB(MIN)}$ as shown in FIG. 1(C), so that the A/T vehicle moves into creeping with an absolute amount of intake air left decreased. This leads to an enormous down shoot of engine speed, which causes the internal combustion engine to stall upon suddenly braking the A/T vehicle while creeping, not only because of the sluggishness of correctively responding to a rapidly increased loading on the internal combustion engine from the automatic transmission that requires a great amount of intake air but also because the engine speed $N_E$ has dropped down to the desired engine idling slow $N_{OID}$.

SUMMARY OF THE INVENTION

The primary object of the present invention is to provide an engine idling speed control system which enables the internal combustion engine to steadily speed down to a desired engine idling speed.

Another object of the present invention is to provide an engine idling speed control system which ensures that the internal combustion engine does not stall even when the engine speeds down rapidly.

The objects of the present invention are achieved by an engine idling speed control system for an internal combustion engine of an automotive vehicle equipped with an automatic transmission of a type having a torque converter. An intake air feedback controlling system increasingly or decreasingly controls the amount of intake air fed to the internal combustion engine with an intake air controlling value positively or negatively variable in accordance with a difference between an actual engine speed detected by an engine speed sensor and a predetermined engine idling speed, even in a driving range of the automatic transmission, so as to control the internal combustion engine to drop an operating speed to a desired engine idling speed. An intake air controlling value limiting means limits decreasing variations of the intake air controlling value to a limit value which is higher when the vehicle is running at a speed higher than a predetermined vehicle creeping speed than when the vehicle is running at a running speed lower than the predetermined vehicle creeping speed.

In a vehicle creeping condition wherein loadings on the internal combustion engine from the automatic transmission is low while the vehicle runs at a relatively high speed and the internal combustion engine actually operates at a speed higher than the predetermined engine idling speed, the limit of decrease of the feedback controlling value is changed, depending upon an actual speed of the vehicle Accordingly, when hard braking is applied even while the vehicle creeps, the responsibility of engine speed control to the desired engine idling speed is quick without any engine stalling.

BRIEF DESCRIPTION OF THE DRAWINGS

Still other objects of the invention and more specific features will become apparent to those skilled in the art from the following description of the preferred embodiment considered together with the accompanying drawings wherein like reference characters have been used in the different figures to denote the same parts and in which.

DESCRIPTION OF THE PREFERRED EMBODIMENT

Because internal combustion engines are well known, the present description will be directed in particular to elements forming parts of, or cooperating directly with, the system in accordance with the present invention. It is to be understood that the elements not specifically shown or described can take various forms well known to those skilled in the art.

Figure 2:
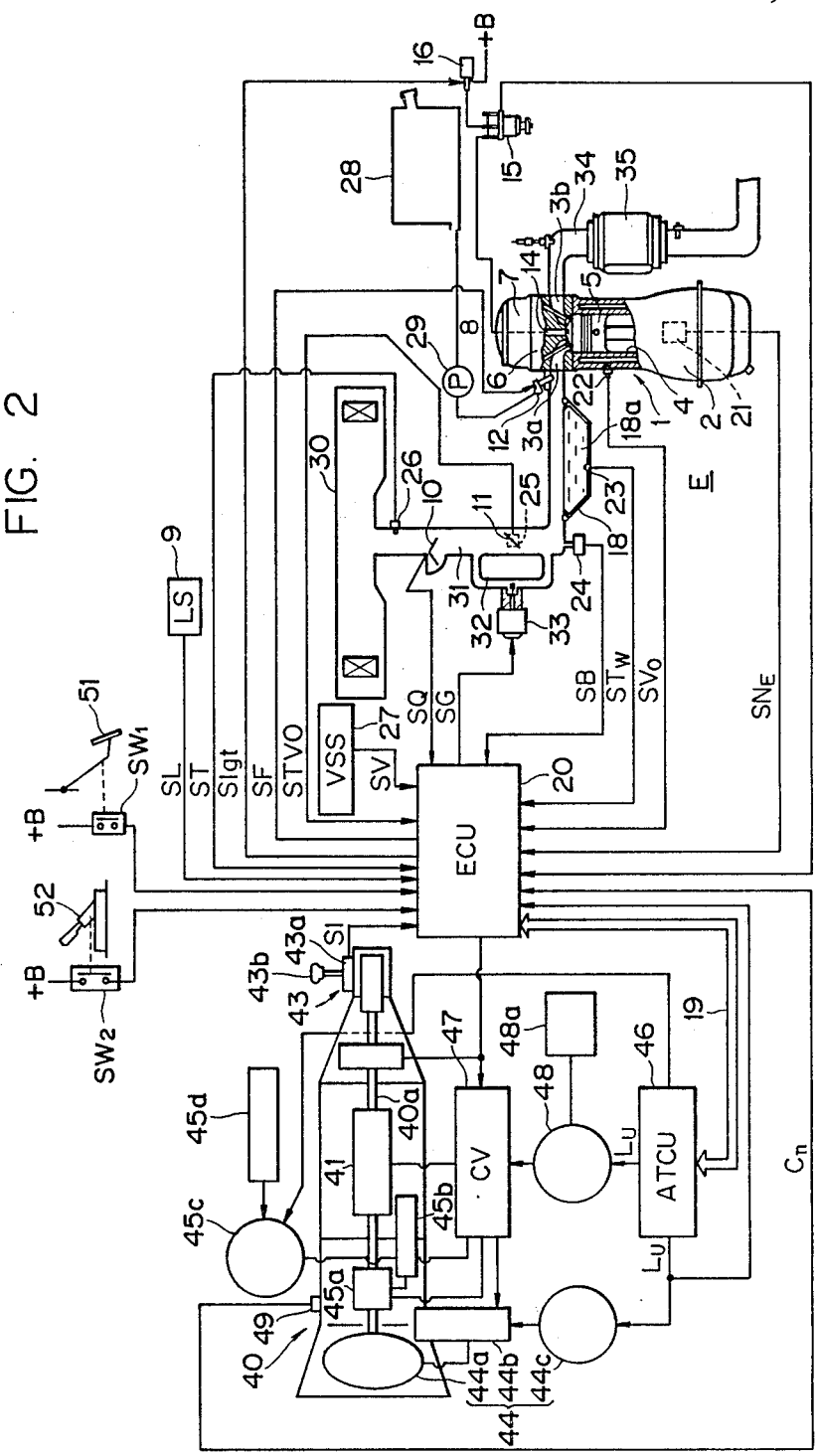
FIG. 2 is a schematic illustration showing an engine idling speed control system in accordance with a preferred embodiment of the present invention.

Referring to the drawings in detail, particularly to FIG. 2, an engine body 1 of an internal combustion engine E, having an engine idling control system controlling intake air in accordance with a preferred embodiment of the present invention, in cooperation with an automatic transmission with a torque converter, is shown. The engine body 1 consists of an cylinder block 2 provided with a cylinder bore 4 in which a piston 5 can slide. A cylinder head 6 is mounted on the cylinder block 2. Cylinder head cover 7 is provided to cover the upper portion of the cylinder head 6. A combustion chamber 8 is formed in the cylinder by the top of the piston 5, a lower wall of the cylinder head 6 and the cylinder bore 4. A cylinder 3 is provided with an intake port 3a and an exhaust port 3b. The intake port 3a and the exhaust port 3b open into the combustion chamber 8, and are opened and shut at a predetermined timing by an intake valve and an exhaust valve, respectively.

Intake air is introduced into the cylinder through an air cleaner 30 and an intake passage 31. The intake passage 31 is provided with an airflow meter 10 for detecting the amount of air passed therethrough and outputting an air flow signal SQ, and a throttle valve 11 arranged, in this order, from the upstream side. The intake passage 31 is further provided in the vicinity of the intake port 3a with a fuel injection nozzle 12 for providing a supply of fuel to the internal combustion engine E from a fuel tank 28 by a fuel pump 29. The throttle valve 11 controls the amount of air delivered to the internal combustion engine E.

Intake passage 31 is formed with a bypass passage 32 lying between the upstream side and the down stream side of the throttle valve 11. The bypass passage 32 is provided with an intake air control means in a form of an electronic controlled, intake air control solenoid valve 33 for allowing intake air to flow through the bypass passage 32 bypassing the throttle valve 11 so as to control the amount of intake air passing through the throttle valve 11, thereby controlling the speed of the engine when idling.

A spark plug 14 is threaded into the cylinder head 6 at the top of the combustion chamber 8. This spark plug 14, which is in cooperation with a distributor 15 and an igniter 16, constitutes a firing system well known in the art. Burned air is exhausted through an exhaust passage 34 with a rhodium catalytic converter (CCRO) 35 incorporated therein.

Internal combustion engine E is further provided with an engine speed sensor 21 and a knock sensor 22. The engine speed sensor 21, which is in cooperation with, for example, a crankshaft (not shown) of the internal combustion engine E detects the speed of the internal combustion engine E and outputs an engine speed signal $SN_E$. The knock sensor 22, which is embedded in the cylinder block 2, detects engine knockings and outputs an engine knock signal $SV_O$ whose voltage depends upon the intensity of engine knocking. An engine coolant temperature sensor 23, which is disposed in a cooling water tank 18, detects the temperature of cooling water 18a and outputs a water temperature signal $ST_W$. The air intake passage 31 is further provided with a boost pressure sensor 24 at the downstream side of the throttle valve 11, an idle position switch or sensor 25 in cooperation with the throttle valve 11, an intake air temperature sensor 26 disposed close to the upstream end thereof The boost pressure sensor 24 detects the boost pressure of the internal combustion engine E depending upon engine loadings and outputs a boost pressure signal SB. The idle position sensor 25 detects openings or positions of the throttle valve 11 and outputs a throttle opening signal STVO. The intake air temperature sensor 26 detects the temperature of intake air flowing through the intake passage 31. In addition to these sensors 21-26, a vehicle speed sensor (VSS) 27 is provided to detect the speed of the vehicle and outputs a vehicle running speed signal SV. All of these sensors 21-27 are well known in construction and operation to those skilled in the art and need not be explained in detail herein.

The outputs of the sensors 21-27 are connected to an engine control unit (ECU) 20 comprising a microcomputer or central processing unit (CPU), an intake air feedback control circuit, memories (ROM and RAM) and an I/0 interface circuit. The engine control unit (ECU) 20 provides outputs necessary for operating the internal combustion engine E1: an intake air feedback controlling signal SG, an injection controlling signal SF and an ignition timing controlling signal SIgt to the intake air control solenoid valve 33, the fuel injection nozzle 12 and the igniter 16, respectively The intake air feedback controlling signal SG gives an intake air controlling value $G_{FB}$, in the form of a P-I duty rate, consisting of the sum of a proportional value P and an integrated value I which is increasingly or decreasingly variable in accordance with the speed difference $\pm \Delta N_E$ between the actual engine speed $N_E$ detected by the engine speed sensor 21 and a desired engine idling speed $N_{OID}$ previously determined. The intake air feedback control signal SG controls the intake air control solenoid valve 33 to open at the P-I duty rate ratio so as to increasingly or decreasingly control the amount of intake air flowing through the bypass passage 32.

An automatic transmission 40, which has a lockup torque converter equipped with over-drive feature, is connected with an output shaft (not shown) of the internal combustion engine E. The automatic transmission 40 comprises a transmission gear train 41, a centrifugal governor 42 disposed on a transmission output shaft 40a between the transmission gear train 41 and a transmission shift unit 43 for detecting the speed of rotation of the transmission output shaft 40a. The automatic transmission 40 has a lockup assembly 44 consisting of a lockup clutch 44a, a lockup control valve 44b and a lockup solenoid 44c, an over-drive assembly 45 consisting of an over-drive gear 45a, an over-drive valve 45b, an over-drive solenoid 45c and an over-drive switch 45d, and an automatic transmission control unit (ATCU) 46 equipped with a lockup control feature. A control valve (CV) 47 controls the lockup control valve 44b, the over-drive gear 45a, the over-drive valve 45b and the transmission gear train 41. A kick-down solenoid 48 associated with a kick-down switch 48a is disposed between the automatic transmission control unit (ATCU) 46 and the control valve (CV) 47. The automatic transmission 40 is further provided with a turbine speed sensor 49 for detecting the speed of rotation of a turbine of a torque converter. A turbine speed signal $C_n$ is input into the engine control unit (ECU) 20.

The automatic transmission control unit (ATCU) 46 judges the vehicle operating condition based on various signals. When it is judged that an over-drive condition and a lockup condition are developed, the automatic transmission control unit (ATCU) 46 outputs a lockup signal $L_u$ so as to cause the kick-down solenoid 48 and the control valve 47 to make turn the lockup control valve 44b, the over-drive gear 45a, the overdrive valve 45b and the transmission gear train 41 operative and, simultaneously, to cause the lockup solenoid 44c to actuate the lockup clutch 44a, thereby effecting the lockup operation of the torque converter. The lockup signal $L_u$ is also input into the engine control unit (ECU) 20. The engine control unit (ECU) 20 and the automatic transmission control unit (ATCU) 46 are interconnected with each other by way of a data bus line 19.

The transmission shift unit 43 is provided with an inhibitor switch 43a which outputs an inhibition signal $S_i$ to the engine control unit (ECU) 20 when a shift stick 43b selects at least either a neutral position (N) or a drive position (D).

A foot-brake switch SW1, which is in cooperation with a foot-brake pedal 51 provided in a driver's compartment of the vehicle, is closed or turned on to output a brake signal $B_f$ to the engine control unit (ECU) 20 when the foot-brake pedal 51 is depressed. A hand brake switch SW2, which is in cooperation with a hand brake lever 52 provided in the driver's compartment, is closed or turned on to output a hand brake signal $B_h$ to the engine control unit (EPU) 20 when the hand brake lever 52 is pulled.

Figure 3:
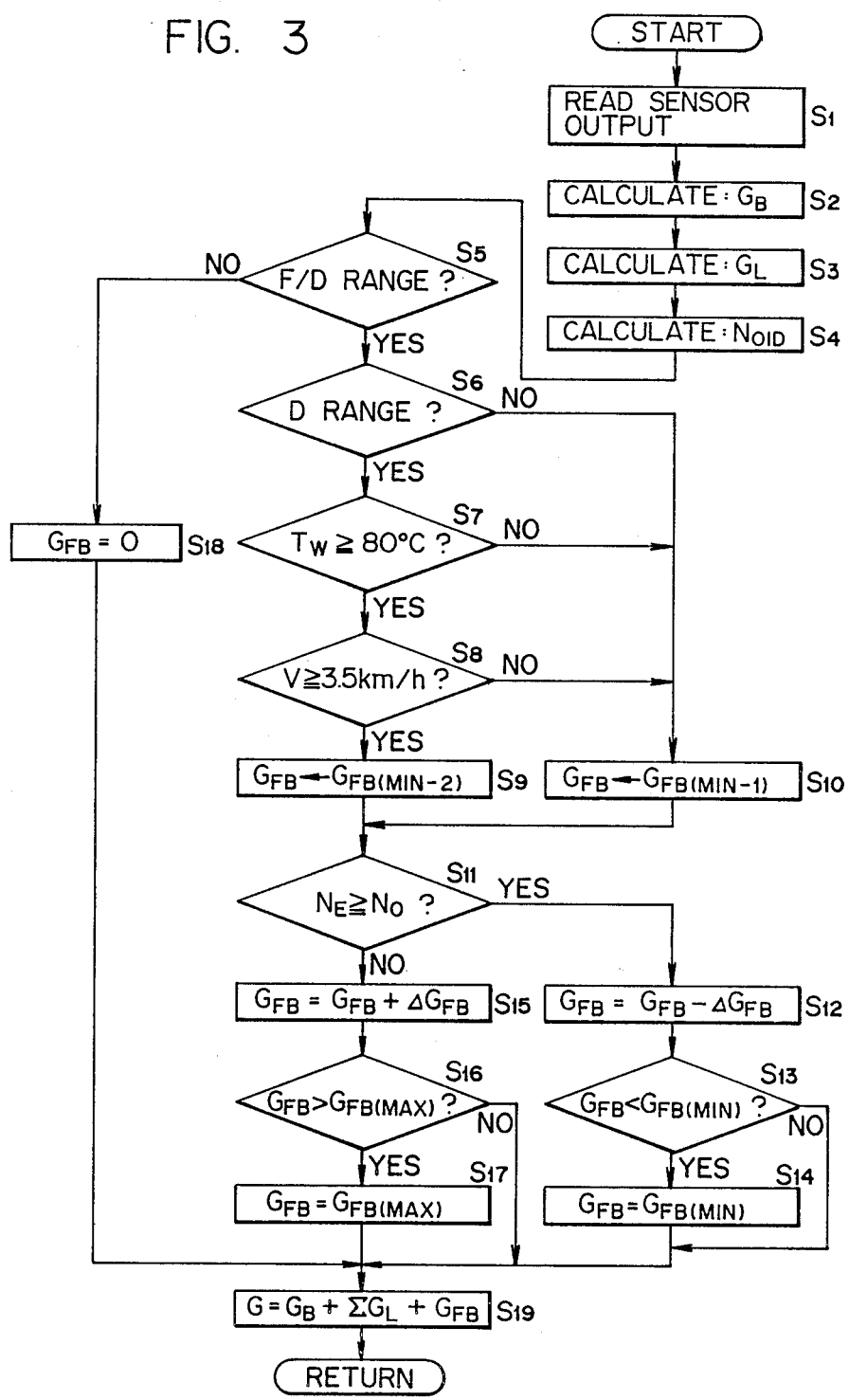
FIG. 3 is a flow chart illustrating an intake air control by the idle speed control system shown in FIG. 2.

The operation of the internal combustion engine E depicted in FIG. 2 is best understood by reviewing FIG. 3, which is are a flow chart illustrating an intake air control routine for the microcomputer of the engine control unit (ECU) 20. Programming a computer is a skill well understood in the art. The following description is written to enable a programmer having ordinary skill in the art to prepare an appropriate program for the microcomputer of the engine control unit (ECU) 20. The particular details of any such program would of course depend upon the architecture of the particular computer selected.

Figure 4A:
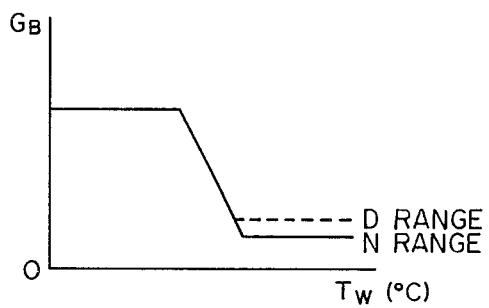
FIGS. 4(A) and 4(B) are maps for drawing a primary intake air flow controlling value and a desired engine idling speed, respectively.
Figure 4B:
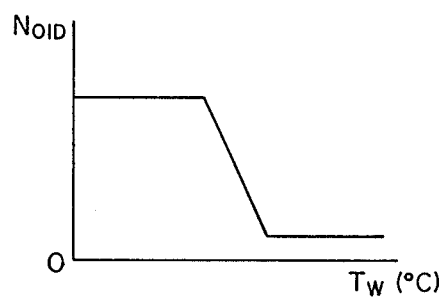

Referring now to FIG. 3, the first step S1 is to read at least the outputs SL, STVO, $SN_E$ and $ST_W$ of the sensors 9, 11, 21 and 23 in order to determine control parameters in subsequent steps: a primary intake air controlling value $G_B$ in step S2, a load-depending correcting value $G_L$ in step S3 and a desired engine idling speed $N_{ID}$ in step S4. The primary intake air controlling value $G_B$ is drawn in accordance with the temperature of the cooling water 18a from an intake air flow-temperature map such as shown in FIG. 4(A) in step S2. The load-depending correcting value $G_L$ is, as was previously described, determined, corresponding to the sum of values inherent in various kinds of loadings, such as those of an air conditioning system, a power steering system, a headlight system, etc and includes a fixed correcting value inherent in drive range (D) when the automatic transmission is in the drive range (D). The desired engine idling speed $N_{OID}$ is drawn in accordance with the temperature of the cooling water 18a from an idling speed-temperature map such as shown in FIG. 4(B).

After the determination of the parameter values $G_B$, $G_L$ and $N_{OID}$, a decision is made in step S5 as to whether the internal combustion engine E is operated in the F/B control range. This decision is made based on the condition of the idle position sensor 25 and the operating engine speed $N_E$. The engine control unit (ECU) 20 judges that the internal combustion engine E is in the F/B control range when the idle position sensor 25 is turned on, indicating that the throttle valve 11 is fully closed or in its idle position, and the engine operating speed $N_E$ is lower than the primary engine speed $N_{OFB}$ that is approximately 600 rpm faster than the desired engine idling speed $N_{OID}$.

If the answer to the decision in step S5 is no, indicating that the engine operating condition is not in the F/B control range, then, the speed-depending feedback correcting value $G_{FB}$ is set to zero in step S18. The amount of intake air is controlled, based on the eventual controlling value G as the sum of the primary intake air controlling value $G_B$ and the load-depending correcting value $G_L$ in an open-loop system in step S19. On the other hand, if the answer to the decision in step S5 is yes indicating the engine operating condition is in the F/B control range, decisions are consequently made in steps S6, S7 and S8 in order. The decision in step S6 is made as to whether the automatic transmission 40 is in the drive range (D). If the answer to the decision in step S6 is yes, then, the decision as to whether the temperature $T_w$ of the cooling water 18a is higher than 80° C. in step S7. If the answer to the decision in step S7 is made is yes, this indicates that the internal combustion engine E has been warmed up. Then the decision is made in step S8: "is the A/T vehicle running at a running speed V faster than a predetermined speed of approximately 3.5 Km/h that is defined as a critical creeping speed ?" If in fact the A/T vehicle is running at a running speed V greater than the critical creeping speed of 3.5 Km/h, a limit of decrease in the speed-depending feedback correcting value $G_{FB}$ is changed to an upper limit of of the decrease speed-depending feedback correcting value $G_{FB(MIN-2)}$ that is smaller than a lower limit of decrease of the speed-depending feedback correcting value $G_{FB(MIN-1)}$ as in the conventional engine idling speed control procedure, in step S9. As the result of changing the limit of decrease of the speed-depending feedback correcting value $G_{FB}$ to the upper limit of decrease $G_{FB(MIN-2)}$ as shown in FIG. 1(D), the feedback controlled amount of intake air is suppressed so as to be quite small between a time $t_2$ at which the A/T vehicle transits into creeping and a time $t_3$ at which the A/T vehicle reaches a creeping speed of approximately 3.5 Km/h as shown in FIGS. 1(A) and 1(B).

Figure 1:
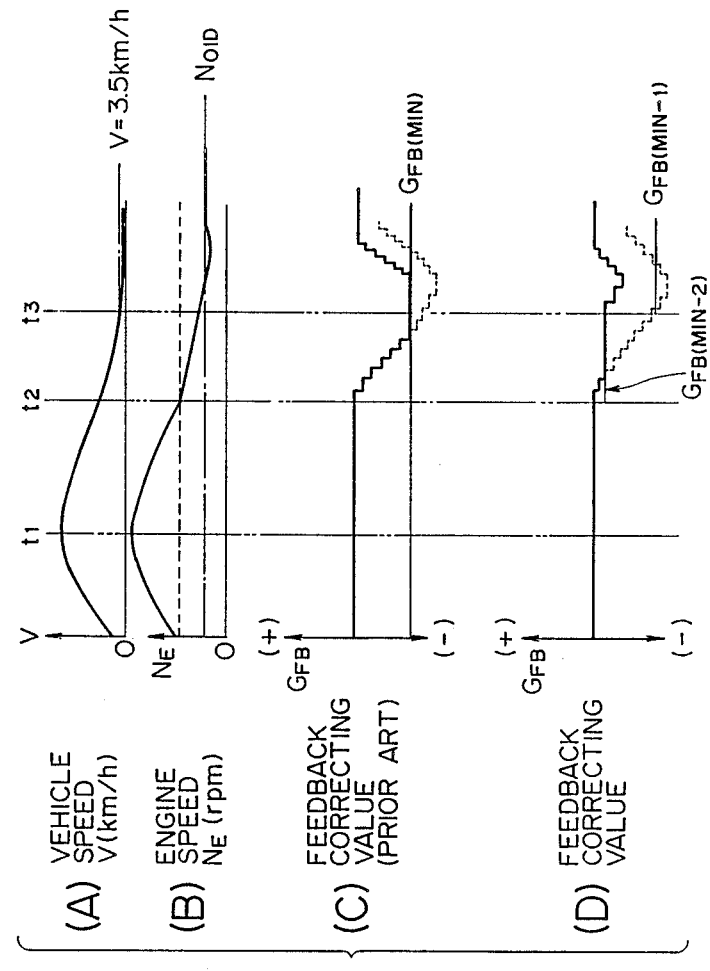
FIG. 1 is a timing chart illustrating an engine idling speed control by an engine idling control system in accordance with a preferred embodiment of the present invention in comparison with a timing chart of an engine idling speed control by the conventional system.

If the answer to any one or more of the decisions in steps S6–S8 is no, the routine forwards to step S10 to maintain or reset the limit of decrease of the speed-depending feedback correcting value $G_{FB}$ to the lower limit of decrease of the speed-depending feedback correcting value $G_{FB(MIN-1)}$ as in the conventional control procedure shown in FIG. 1(C).

Following step S9 or S10, a decision is made in step S11: "is the actual engine operating speed $N_E$ greater than the desired engine idling speed $N_{OID}$?" If the answer to the decision is yes, then the speed depending feedback correcting value $G_{FB}$ is changed stepwise by decrements of $\Delta G_{FB}$ corresponding to the difference $\Delta N_E$ between the actual engine operating speed $N_E$ and the desired engine idling speed $N_{OID}$ in step S12. Thereafter, a decision is made in step S13 as to whether the speed-depending feedback correcting value $G_{FB}$ thus changed is smaller than the limit of decrease of the speed-depending feedback correcting value $G_{FB(MIN-2)}$ or $G_{FB(MIN-1)}$ set either in step S9 or in step S10. If in fact the changed speed-depending feedback correcting value $G_{FB}$ is smaller than the limit of decrease of the speed-depending feedback correcting value $G_{FB(MIN)}$, the speed-depending feedback correcting value $G_{FB}$ is restrictively fixed to the limit of decrease of the speed-depending feedback correcting value $G_{FB(MIN)}$ in step S14 and then, an eventual controlling value G for a proper amount of intake air is computed in step S19.

On the other hand, if the answer to the decision in step S11 is no, indicating that the actual engine operating speed $N_E$ is lower than the desired engine idling speed $N_{OID}$, the speed-depending feedback correcting value $G_{FB}$ is increasingly changed stepwise by increments of $\Delta G_{FB}$ in accordance with the difference $\Delta N_E$ between the actual engine operating speed $N_E$ and the desired engine idling speed $N_{OID}$ in step S15. Thereafter, a decision is made as to whether the speed-depending feedback correcting value $G_{FB}$ thus changed is greater than a limit of increase of the speed-depending feedback correcting value $G_{FB(MAX)}$ in step S16. If in fact the changed speed-depending feedback correcting value $G_{FB}$ is greater than the limit of increase of the speed-depending feedback correcting value $G_{FB(MAX)}$, the speed-depending feedback correcting value $G_{FB}$ is restrictively fixed to the limit of increase of the speed-depending feedback correcting value $G_{FB(MAX)}$ in step S17 and then, an eventual controlling value G for a proper amount of intake air is computed in step S19.

According to the idling speed controlling system of the present invention, when the amount of intake air is feedback controlled in the state that the automatic transmission is shifted into the drive range (D) after the internal combustion engine E has warmed up and then the A/T vehicle creeps at a running speed of about 3.5 Km/h, a feedback controlling value is suppressed to a value considerably smaller than that in the conventional feedback control, depending upon the change of engine is speed only, taking into account that the internal combustion engine likely to stall because of a small amount of intake air due to a small loading on the internal combustion engine from the automatic transmission and a dropped engine speed close to the desired engine idling speed, and that the engine speed has dropped close to the desired engine idling speed, so that speed of the internal combustion engine can reliably drop to the desired engine idling speed without stalling.

It should be noted that various changes and modifications are apparent to those skilled in the art which are within the scope of the invention, and such changes and modifications are intended to be covered by the following claims.

What is claimed is:

1. An engine idling speed control system for an internal combustion engine of an automotive vehicle equipped with an automatic transmission of a type having a torque converter, said idling speed control system comprising:

an engine operating condition detecting means for detecting at least an actual engine speed;

a vehicle speed detecting means for detecting a running speed of said vehicle;

an intake air feedback controlling system for increasingly or decreasingly controlling the amount of intake air fed to said internal combustion engine with an intake air controlling value increasingly or decreasingly variable in accordance with a difference between an actual engine speed detected by said engine speed detecting means and a predetermined engine idling speed even when said automatic transmission is shifted into a drive range, thereby controlling said internal combustion engine to drop speed to a desired engine idling speed; and an intake air controlling value limiting means for limiting decreasing variations of said intake air controlling value to a limit value which is higher when said vehicle speed detecting means detects a running speed higher than a predetermined vehicle creeping speed than when said vehicle speed detecting means detects a running speed lower than said predetermined vehicle creeping speed.

2. An engine idling speed control system as defined in claim 1, wherein said intake air feedback control system includes an air passage bypassing a throttle valve disposed in an intake air passage connected to said internal combustion engine and controls the amount of air passing through said air passage.

3. An engine idling speed control system as defined in claim 2 and, further including a duty solenoid valve disposed in said air passage and opening at a duty rate determined in accordance with said intake air controlling value.

4. An engine idling speed control system as defined in claim 3, further comprising a control unit which receives an engine speed signal and a vehicle speed signal from said engine operating condition detecting means and said vehicle speed detecting means, respectively, to compute said intake air controlling value, for outputting a controlling signal having said duty rate to said duty solenoid valve.

5. An engine idling speed control system as defined in claim 4, wherein said engine operating condition detecting means further detects loadings on said internal combustion engine, an idle position of said throttle valve and a shifted range of said automatic transmission and wherein said intake air controlling value G is defined as follows:

$$G = G_B + G_L + G_{FB}$$

wherein
$G_B$ is a primary intake air controlling value;
$G_L$ is a load-depending correcting value depending on loadings on said internal combustion engine; and
$G_{FB}$ is a feedback correcting value in accordance with a difference between an actual engine speed and said predetermined engine idling speed.

6. An engine idling speed control system as defined in claim 5, wherein said load-depending correcting value is set to a predetermined value when said engine operating condition detecting means detects that said automatic transmission is in a driving range.

7. An engine idling speed control system as defined in claim 1, wherein said engine operating condition detecting means further detects an idle position of said throttle valve so as to determine that said internal combustion engine is in an intake air control range when said throttle valve is in said idle position and said actual engine speed is a predetermined engine speed.

8. An engine idling speed control system as defined in claim 7, wherein said predetermined engine speed is higher than said predetermined engine idling speed.

9. An engine idling speed control system as defined in claim 7, wherein said predetermined engine speed is approximately 600 rpm higher than said predetermined engine idling speed.

10. An engine idling speed control system as defined in claim 7, wherein said predetermined vehicle creeping speed is close to zero.

11. An engine idling speed control system as defined in claim 7, wherein said predetermined vehicle creeping speed is approximately 3.5 Km/h.

* * * * *